Dec. 10, 1929.  W. T. EATON  1,739,390
CLUTCH

Filed June 18, 1926

Inventor
W. T. Eaton
by
Langner Parry Card & Langner Attys.

Patented Dec. 10, 1929

1,739,390

UNITED STATES PATENT OFFICE

WILLIAM TREAVOURS EATON, OF WANGANUI, NEW ZEALAND, ASSIGNOR OF ONE-HALF TO WILLIAM GAMBLES, OF WANGANUI, NEW ZEALAND

CLUTCH

Application filed June 18, 1926, Serial No. 116,964, and in Australia July 10, 1925.

This invention relates to clutches, couplings, shock absorbers and the like, of the kind in which one member may be rotated free of the other member, but tension between the members is such that one will gradually conform to the movement of the other, thereby permitting a certain amount of freedom between the two parts and thus absorbing any sudden load or shock which comes upon one or other of the members.

The object of the present invention is to enable this class of clutch, coupling or the like to be simply constructed and also that will produce a clutch or coupling which will not depend upon actual frictional contact of metal between the two parts.

According to the present invention, the tension between the two parts is produced by means of oil or other suitable liquid acting as a flexible fluid lock between the two parts and contained in spaces between the working faces of the parts.

Embodiments of the invention will be described with the aid of the accompanying drawings, wherein:—

Figure 1:
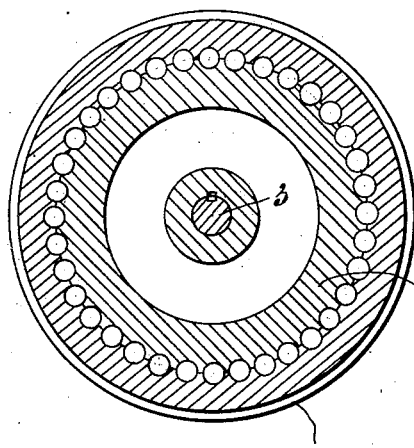
Figure 2:
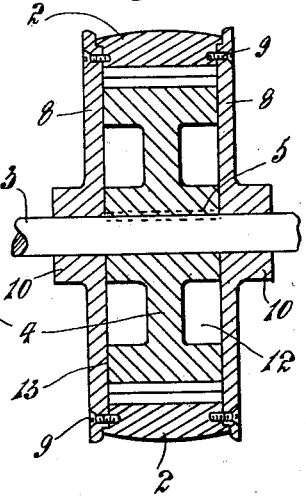
Figure 3:
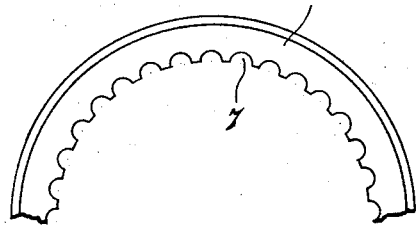
Figure 4:
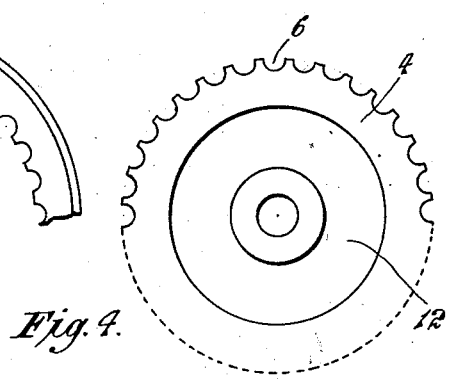
Figure 5:
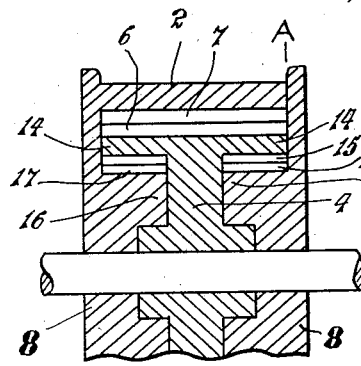
Figure 6:
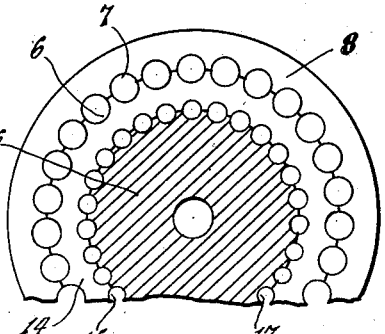

Figure 1, is a side sectional elevation, and
Figure 2, is a cross sectional elevation of a clutch embodying my invention.
Figure 3, is a fragmentary side view of an outer member, and
Figure 4, is an elevation of an inner member of the clutch.
Figure 5, is a cross sectional elevation of a clutch showing a modification of the construction.
Figure 6, is a side sectional elevation on line A—A, Figure 5.

Referring to the drawings, the device consists of a pulley having an outer driving rim 2 freely mounted upon a shaft 3, while the driven member 4 lies within the rim 2 and is fixed to the shaft by a key 5. This inner member 4 is provided with a number of semi-circular recesses 6 extending transversely across the circumferential working face thereof. These recesses 6 are preferably arranged close to each other, as shown in the figures, while upon the inner working face of the driving rim 2 similarly shaped recesses 7 are provided and arranged so that when the semi-circular recesses 6 are opposite the semi-circular recesses 7 a number of circular openings are provided, as shown in Figure 1. The outer rim may be attached to side plates 8 by bolts or screws 9, these side plates having bosses 10 to run freely on the shaft, and the inner faces thereof bear upon the lateral faces of the member 4 sufficiently freely, however, to enable the two members to rotate upon each other. A liquid, preferably heavy oil, is introduced into recesses 12, formed in each side of the member 4, these recesses (Figures 1 and 2) acting as oil chambers. The rotating action of the member 4 when directly driven or when rotated by the fluid lock in the recesses 6 and 7 when the rim 2 is directly driven causes the heavy oil to pass into the recesses 6 and 7, passing between the face 13 of the member 4 and the inner face of the plates 8 and into the recesses 6 and 7. The rotating action of the driving rim 2 will cause the heavy oil to be compressed in the recesses and the compression thereby produced causes the central portion 4 to rotate and at certain speeds the two parts will rotate as one. I have found, however, that if the recesses 6 and 7 are completely filled with oil the chambers 12 may be dispensed with.

The operation, however, may be reversed, the inner member being driven, i. e. the member 4 being rotated by rotating the shaft 3 and the exterior member would be the one to be driven, in which case the exterior construction may be modified to suit the requirements.

When used as a coupling, the inner member would be keyed to one shaft and the exterior member to the other shaft.

In Figures 5 and 6 the inner sides of the laterally projecting rim 14 of the member 4 are provided with recesses 15 and the side plates 8 have inwardly projecting rims 16 provided with recesses 17, to enhance the fluid lock between the two parts.

It is obvious that the parts and recesses may be still further multiplied according to the amount of resistance required.

Devices made according to this principle of construction may also be used for shock absorbers and the like where one member is fixed, and only a partial rotation of the other member would take place.

What I claim is:—

1. In a gradual take up transmission device, an outer ring-like member, a concentrically arranged inner circular member, each of said members having adjacent peripheral faces working one against the other, transverse recesses in each of said faces to form spaces into which viscous fluid is introduced, in order to resiliently lock the said members together, the inner member having formed therein a chamber from which the fluid passes, under centrifugal force, to the recesses.

2. In a gradual take up transmission device, an outer ring-like member, a number of semi-circular recesses of comparatively small radius extending transversely across the circumferential working face of said member as close as possible to each other, a concentrically arranged inner member having its peripheral face working against the peripheral working face of said outer member, a similar number of semi-circular recesses in the working face of said inner member registering with the recesses on the outer member, thus forming a number of circular spaces into which a viscous fluid is introduced in order to lock yieldably the said members together.

In testimony whereof, I have signed my name to this specification.

WILLIAM TREAVOURS EATON.